United States Patent [19]
Bassett et al.

[11] Patent Number: 5,206,766
[45] Date of Patent: Apr. 27, 1993

[54] LASER DIODE ALIGNMENT APPARATUS AND METHOD FOR OPTICAL SCANNERS

[75] Inventors: Jonathan D. Bassett, Ithaca, N.Y.; Charles K. Wike, Jr., Cambridge, Ohio; David E. Weeks, Candor, N.Y.; Rex A. Aleshire, Byesville, Ohio

[73] Assignee: NCR Corporation, Dayton, Ohio

[21] Appl. No.: 719,867

[22] Filed: Jun. 24, 1991

[51] Int. Cl.$^5$ ............................................. G02B 26/08
[52] U.S. Cl. .................................... 359/896; 359/196; 356/121; 356/153
[58] Field of Search ............................... 356/153, 154; 359/196–197, 209–210, 652–654, 811, 818, 819, 896; 372/24; 156/121–123

[56] References Cited

U.S. PATENT DOCUMENTS

| | | | |
|---|---|---|---|
| 3,718,398 | 2/1973 | Becraft et al. | 356/154 |
| 4,452,532 | 6/1984 | Grollimund et al. | 356/154 |
| 4,466,739 | 8/1984 | Kasner et al. | 356/153 |
| 4,836,635 | 6/1989 | De Amorim | 250/227 |
| 4,971,410 | 11/1990 | Wike, Jr. et al. | 359/212 |

*Primary Examiner*—Bruce Y. Arnold
*Assistant Examiner*—James Phan
*Attorney, Agent, or Firm*—Paul W. Martin

[57] ABSTRACT

A laser diode alignment apparatus and method for an optical scanner which independently minimizes lateral and angular deviation of a laser beam from the scanner axis. The alignment apparatus includes a socket member and a plug member. The socket member includes a cylindrical wall portion, including a circular inner ridge having an inwardly facing spherical surface, and a base portion coupled to the cylindrical wall portion having a rearwardly facing spherical surface and a circular aperture therethrough. The plug member contains the laser diode and includes a cylindrical front end portion including a spherical front edge section, having the same curvature as the rearwardly facing spherical surface, and a spherical center portion coupled to the cylindrical front end portion having the same curvature as the inwardly facing spherical surface. The plug member has a beam origin point coinciding with the diode's combined center of rotation and pivot point. The alignment method centers a screen, having a reference point, on the axis and at the focal point of the scanner, places the laser beam origin point on the scanner axis, and moves the laser diode until the laser beam image coincides with the reference point on the screen.

38 Claims, 9 Drawing Sheets

LASER DIODE ALIGNMENT APPARATUS AND METHOD FOR OPTICAL SCANNERS

BACKGROUND OF THE INVENTION

The present invention relates to optical scanners and more specifically to a laser diode alignment apparatus and method for optical scanners.

Optical scanners are well known for their usefulness in retail checkout and inventory control. Optical scanners generally employ a laser diode, the light from which is focused and collimated to produce a scanning beam. An optical transceiver directs the beam against a plurality of stationary mirrors, and collects the beam after it is reflected by a bar code label. A motor rotates the optical transceiver, and a detector receives the returning beam. The pattern produced by such a scanner is characterized by lines oriented at various angles to one another. An example of an optical scanner can be found in commonly assigned U.S. Pat. No. 4,971,410, entitled, "Scanning and Collection System for a Compact Laser", issued Nov. 20, 1990, to Wike, Jr. et al. This patent is hereby incorporated by reference.

The laser diodes used in optical scanners must be aligned. Misalignment is measured as "centering" error and "pointing" error. Centering error is defined as lateral deviation from an optimum laser beam exit point on the laser mount. Centering error in scanners similar to the one disclosed in Wike, Jr., results in the laser beam being parallel to the motor shaft but not along the centerline of the shaft. Thus, the beam center strikes the wrong point on a deflecting mirror at the end of the shaft.

Pointing error is defined as angular deviation from the centerline of the shaft. Pointing error also results in the laser beam striking the deflecting mirror at the wrong location. If the pointing error is large enough, the beam will reflect off the interior wall of the shaft. Generally, optical scanners are more sensitive to pointing error than to centering error. A very small amount of pointing error will result in a large loss of beam power.

Known methods for eliminating centering and pointing error involve positioning a multitude of mirrors and making a multitude of tedious back-and-forth adjustments. These methods are complicated by the fact that centering adjustments are often undone by pointing adjustments, and vise versa.

Therefore, it would be desirable to produce an optical scanner which incorporates an apparatus for minimizing centering and pointing error. It would also be desirable for such an apparatus to be capable of minimizing both types of error using minimal adjustment.

SUMMARY OF THE INVENTION

In accordance with the teachings of the present invention, a laser diode alignment apparatus and method for optical scanners is provided. The optical scanner includes a laser diode for producing a scanning laser beam. The alignment apparatus includes a socket member and a plug member. The socket member includes a cylindrical wall portion having a back end and an inner surface describing a cylindrical aperture, a circular ridge around the inner surface having an inwardly facing spherical surface which joins the inner surface, a plurality of expansion slots extending inwardly from the back end of the wall portion, and a base portion coupled to the cylindrical wall portion having a rearwardly facing spherical surface and a circular aperture therethrough.

The plug member contains the laser diode and includes a cylindrical front end portion, having a diameter smaller than the diameter of the cylindrical aperture. The front end portion includes a spherical front edge section having the same curvature as the rearwardly facing spherical surface. The plug member further includes a spherical center portion coupled to the cylindrical front end portion having the same curvature as the inwardly facing spherical surface, and a rear end portion coupled to the center portion.

It is an important feature of the present invention that the beam origin point lies on the scanner axis. Therefore, centering error is minimized, independently of pointing error, merely by inserting the plug member into the socket member.

It is an important feature of the present invention that the plug member has a combined center of rotation and pivot point. Therefore, pointing error can be easily corrected by rotating and pivoting the plug member about the point.

The alignment method of the present invention includes placing a screen, having a reference point indicated thereon, at the focal point of the scanner, such that the reference point is aligned with the axis of the scanner. The next step is placing the laser beam origin point on the scanner axis. In the preferred embodiment, this step is accomplished by inserting the plug member into the socket member. The internal components of the scanner are removed, leaving the frame support member and the plug and socket members. The laser diode is activated to produce a laser beam image on the screen. The final step is moving the laser diode until the laser beam image coincides with the reference point on the screen. In the preferred embodiment, this final step includes the substeps of grasping the rear end portion, pivoting the plug member about the beam origin point, and rotating the plug member about the beam origin point.

It is accordingly an object of the present invention to provide a laser diode alignment apparatus and method for optical scanners.

It is another object of the present invention to provide a laser diode alignment apparatus and method for optical scanners which corrects pointing error independently of beam centering error.

It is another object of the present invention to provide a laser diode alignment apparatus and method for optical scanners which is capable of minimizing centering and pointing error by minimal adjustment.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
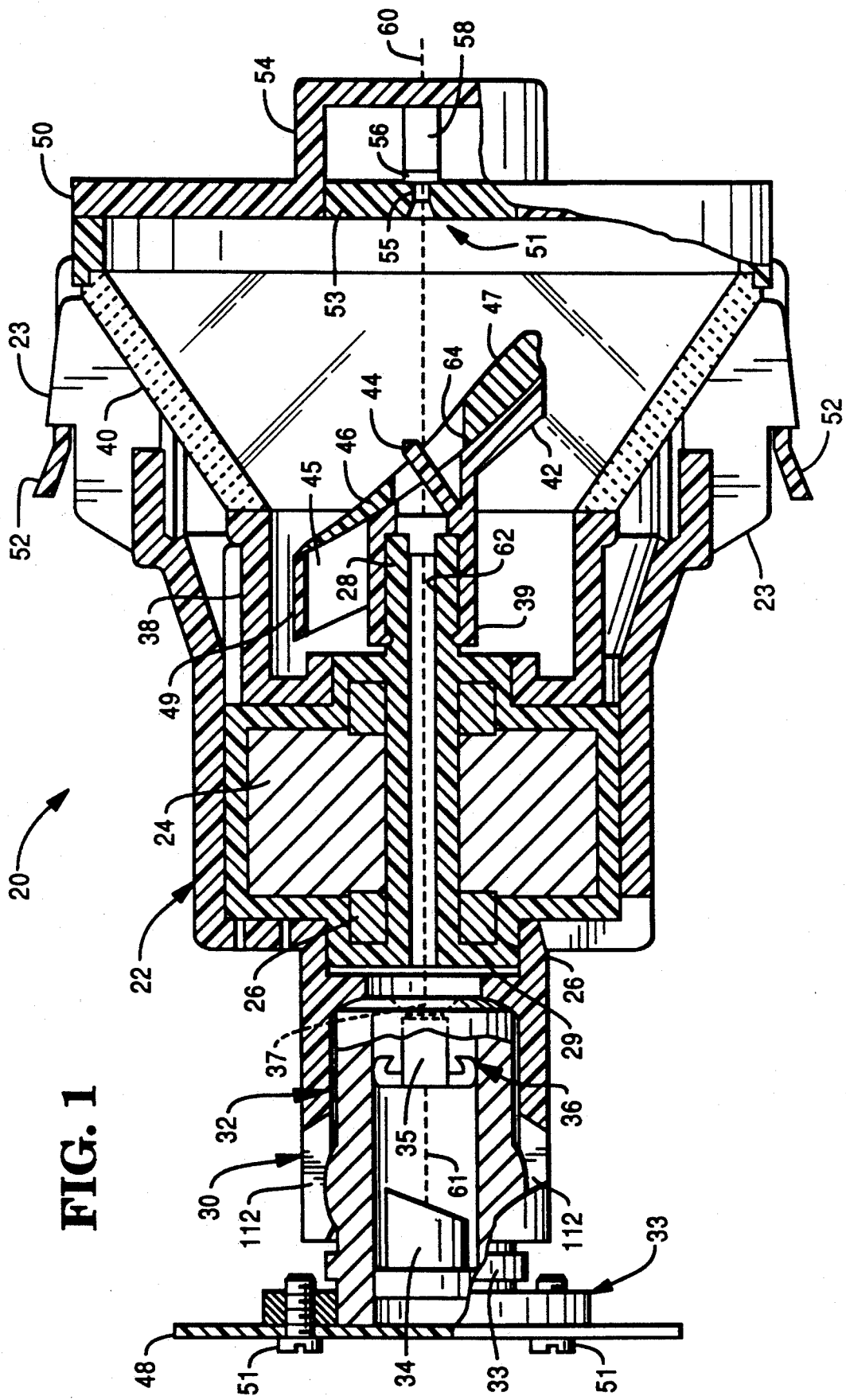
FIG. 1 is a sectional view of an optical scanner employing the laser diode alignment apparatus of the present invention and a first embodiment of the plug's internal components.

Referring now to FIG. 1, there is shown an optical scanner 20 employing the laser diode aligning apparatus of the present invention. The optical scanner 20 includes a molded frame support member 22 having a plurality of latching portions 23. The frame support member 22 may be molded of any type of shock resistant plastic material such as polycarbonate. Mounted within the support member 22 is a motor 24. Journaled within the motor 24 by bearings 26 is a hollow drive shaft 28 extending through the motor 24.

A rear extension portion 30 of the frame support member 22 includes a socket member 32 and a machined brass plug member 33 inserted into the back end thereof. The motor hub 29 is seated in the front end of the socket member 32. Within the plug member 32 is a laser diode 34, a focusing lens 35, and a lens lock 36 containing a circular collimating aperture 37, all being symmetric about a central plug axis 61. Here, the plug axis 61 is in alignment with the spin axis 60 of the drive shaft 28. The diode 34 outputs a diverging light beam which is focused and collimated on a reference plane (not shown) in front of the optical scanner 20 by the lens member 35 and the circular aperture 37. The diameter of circular aperture 37 is sufficient to maintain a predetermined optimal "F" number. A printed circuit board 48 containing circuitry for controlling the laser diode 34 may be fastened to the back end of the plug member 33 using screws 51. The control circuitry may also be coupled to the diode through a wire cable.

Slidably mounted within the frame support member 22 is a molded mirror support member 38 constructed of any type of polycarbonate plastic which includes a plurality of acrylic turning or pattern mirrors 40, each of which extends outwardly from the support member 38 at an angle of approximately thirty-three degrees and in which each mirror is offset to each of the other mirrors 40 by approximately three degrees. The number of mirrors employed is controlled by the number of scan lines required for the scan pattern. In the optical scanner 20, there are eight turning mirrors. The mirrors have their reflecting surfaces coated with gold or aluminum. Secured to the front end of the drive shaft 28 is one embodiment of an optical transceiver 42 comprising a flat deflecting mirror portion 44 which extends obliquely across the spin axis 60 of the drive shaft 28 and a collection mirror portion 46 which comprises a sloping aspheric concave surface 47 for collecting the scanning light beams reflected from a scanned bar code label. The optical transceiver 42 may be fitted over the shaft 28 using a snap fitting member 39 and may be molded of any type of transparent material such as a polycarbonate plastic material. The reflecting surfaces of the transceiver 42 are coated with gold which reflects the red light band while allowing all other bands of light to pass through the surface of the transceiver 42. In order to reduce the noise generated by the stray light passing through the transceiver 42, the rear surfaces of the transceiver 42 may be coated with silicon oxide which absorbs the light.

The deflecting mirror portion 44 extends through a slot 64 in the collecting surface 47 of the collection portion 46. The mirror portion is oriented at an oblique angle to the surface 47. The transceiver includes a rear portion 49 which includes a plurality of depending rib portions 45 which provide a balance to the transceiver when rotated about the spin axis. Mounted to the front portion of the mirror support member 38 is a transparent acrylic photodetector support member 50, having a plurality of flexible finger members 52 which snap over the latching portions 23 of the frame support member 22 for holding the photodetector support means 50 to the mirror support member 38. Coating the reflecting surfaces of the mirrors 40 and the transceiver 42 with gold or aluminum, together with the use of the acrylic support member 50, provides high reflectivity and transmission of light. Mounted within a protruding housing portion 54 of the support member 50 is a detector assembly 51 comprising a support member 53 having a limiting aperture 55 and a photodetector 56 secured to the member 53 and mounted within a holder 58 secured to the inside end portion of the housing portion 54.

Figure 2:
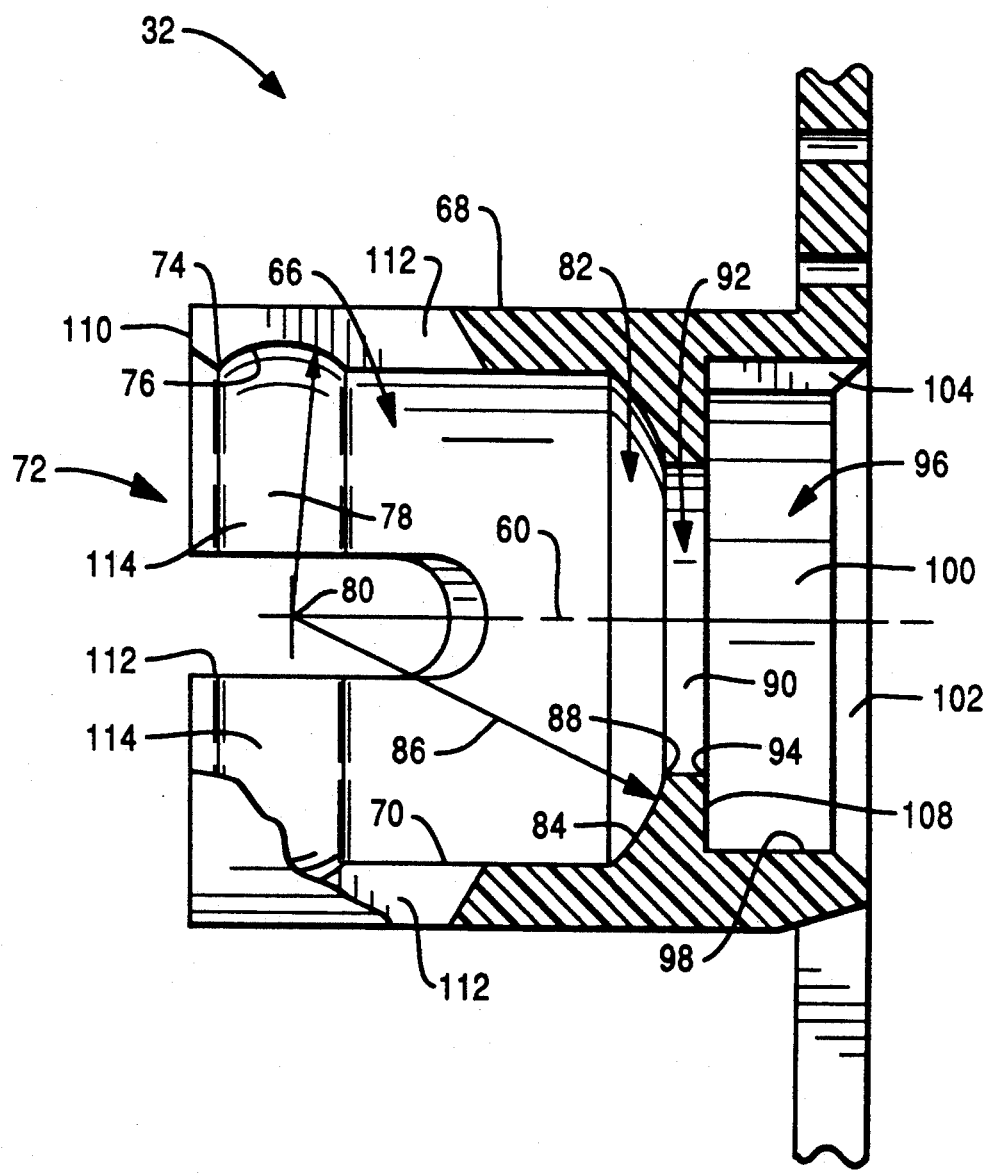
FIG. 2 is an enlarged sectional view of the socket member of the laser diode alignment apparatus shown in FIG. 1.
Figure 3:
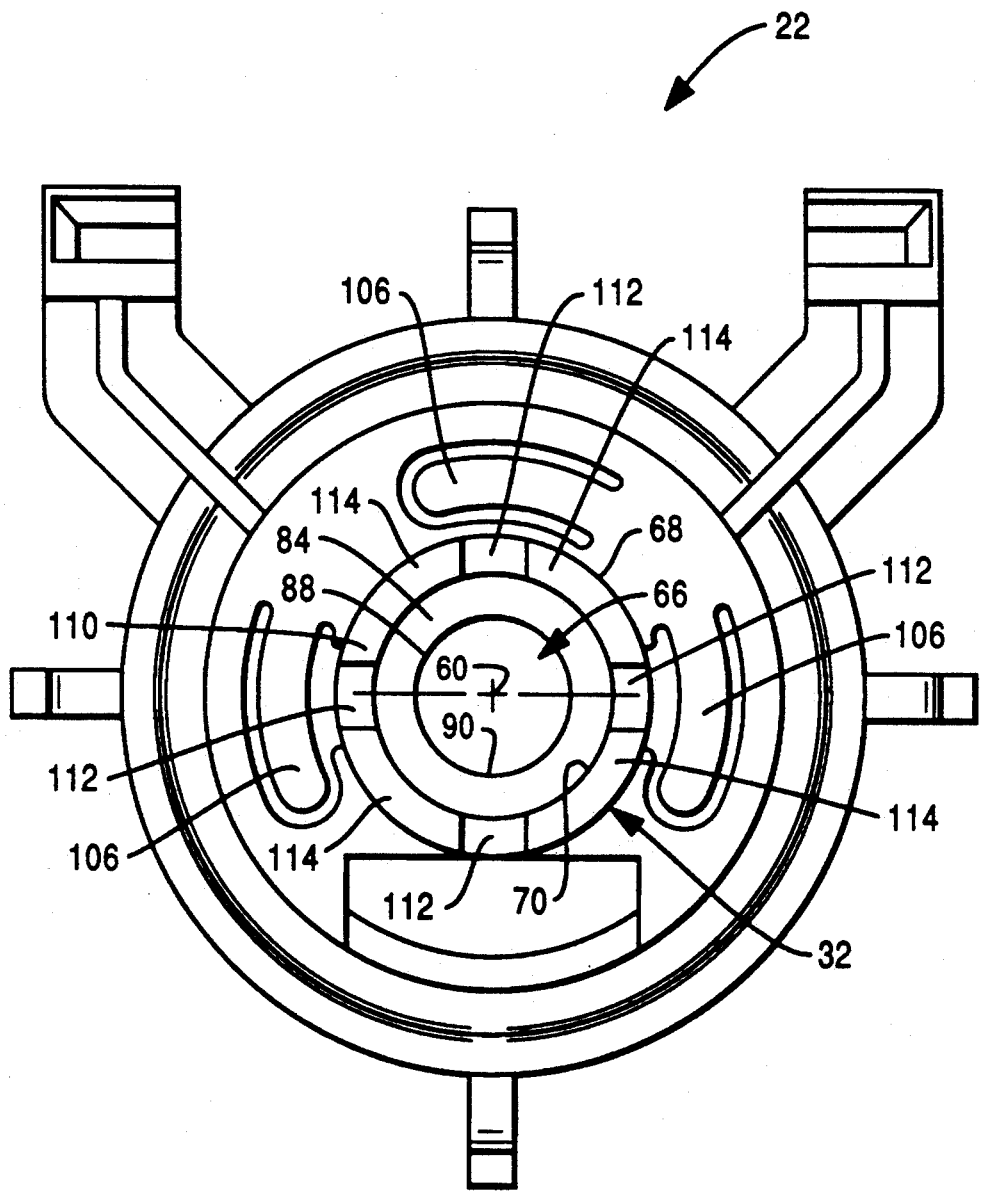
FIG. 3 is a back end view of the frame support member of the laser diode alignment apparatus of the present invention.
Figure 4:
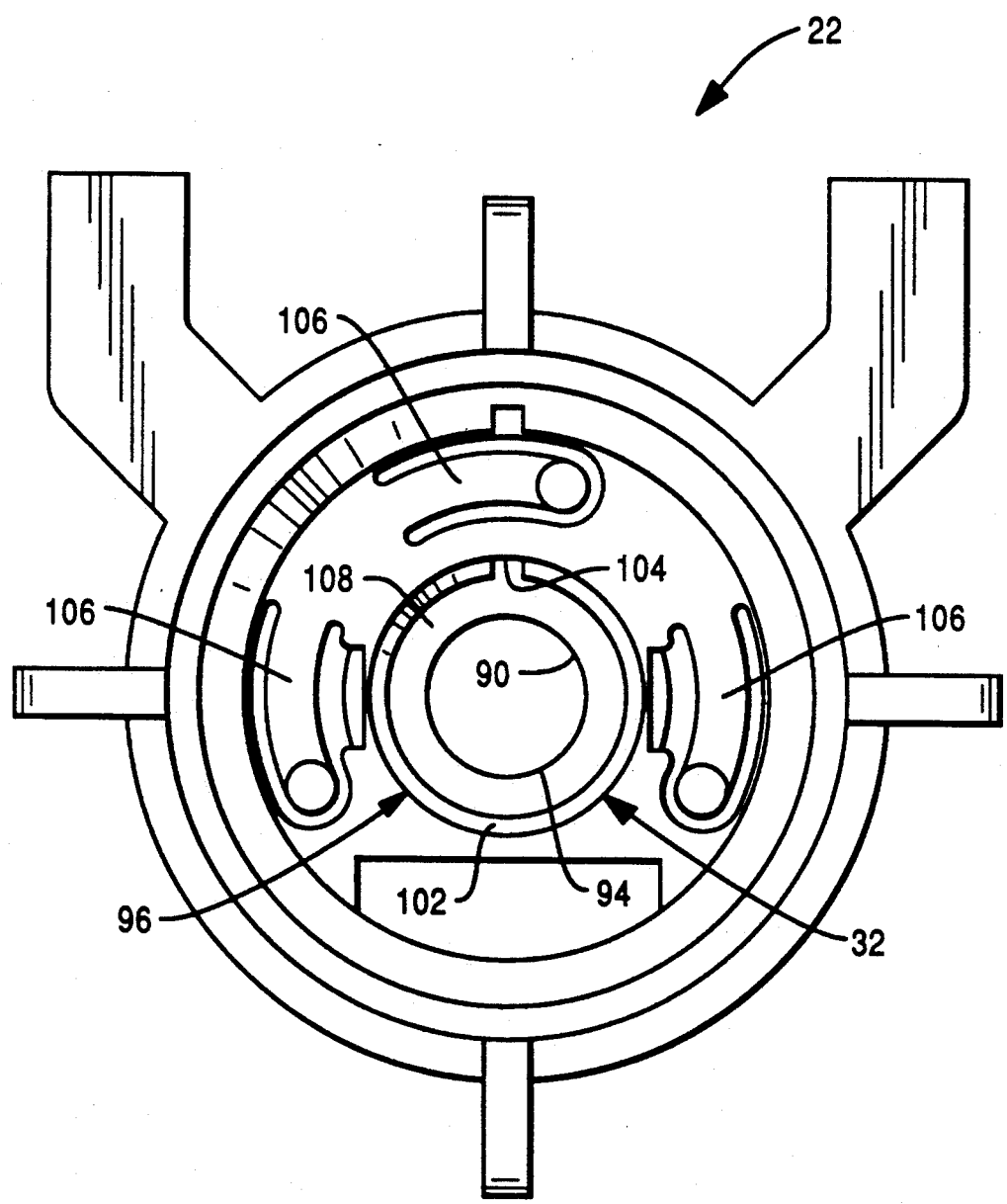
FIG. 4 is a front end view of the frame support member of the laser diode alignment apparatus of the present invention.

Referring now to FIGS. 2, 3, and 4, the socket member 32 is shown in more detail. The socket member 32 employs a generally cylindrical wall portion 66 having cylindrical outer and inner surfaces 68 and 70. The back end 72 of the socket member 32 is open. The inner surface 70 of the wall portion is characterized by a circular ridge 74 at the back end 72 which serves as a detent for holding the plug member 33 in place within the socket member 32. The inwardly facing surface 76 of the ridge 74 is curved and joins inner surface 70. The curvature is described by a radial line 78 originating at a point 80 on the axis 60. The point 80 approximates the origin of the laser beam.

Forward of the wall portion 66 is a base portion 82 whose outer surface is contiguous with the outer surface 68 of the wall portion 66 and whose inner surface 84 is described by a radial line 86 from the point 80. The front edge 88 of the inner surface 84 describes a circular aperture 90 extending through a neck portion 92.

The front edge 94 of the neck portion 92 joins a front end portion 96 whose inner surface 98 describes a cylindrical aperture 100 having a diameter greater than the diameter of the neck portion 92. The front end portion 96 serves as a seat for the motor hub 29. The front end portion 96 has an outwardly beveled front lip 102 which forms the frontal opening of the socket member 32. Slot 104 receives a tab on the motor hub 29 which keeps the motor hub 29 from turning during scanner operation. Cantilever springs 106 keep the motor hub 29 from contacting the back wall 108 of the front end portion 96.

Extending inwardly from the back edge 110 of the wall portion 66 are four expansion slots 112. These slots allow the four wall portions 114 to expand outwardly during plug insertion. They also provide a convenient opening for pouring glue to maintain the plug member 33 in place after alignment.

Figure 5:
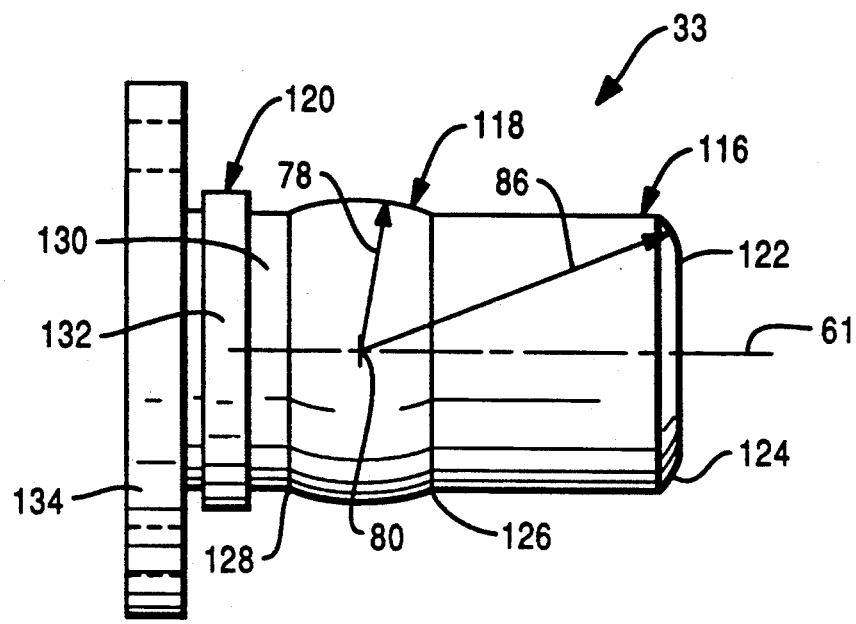
FIG. 5 is a side view of the plug member of the laser diode alignment apparatus of the present invention.

Referring now to FIG. 5, there is shown a side view of the plug member 33. The plug member 33 includes a front end portion 116, a center portion 118, and a rear end portion 120. The front end portion 116 is cylindrical in shape, having a diameter slightly less than the inner diameter of the wall portion 66 to provide space for the plug member 33 to pivot about the point 80. The front surface 122 of the front end portion 116 is circular, and the edge 124 is curved, having the same curvature as the inner surface 84.

The center portion 118 is part of a central section of a sphere having the same curvature as the surfaces 76 and 77 and whose center corresponds to point 80. The center portion 118 is symmetric about the plug axis 61 and is defined by a front edge 126 which joins the front end portion 116 and a rear edge 128 which joins the rear end portion 120. Thus, the point 80 is both the pivot point and center of rotation for the plug member 33. When both pivotal and rotational motions are combined, the plug axis 61 can be pivoted to any angle measured from the axis 60, up to the limit of travel of the plug member 33, and the exit point of the laser beam from the plug member 33 can be rotated in a circle about the axis 60.

The rear end portion 120 has a first cylindrical section 130 having the same diameter as the front end portion 116, a middle cylindrical section 132 having a diameter larger than the diameter of the front end portion 116, and a cylindrical base section 134 having a diameter larger than the diameter of the middle portion 132. The rear end portion 134 is largely outside the socket member 32 when the plug member 33 is inserted to allow space for pivoting the plug member 33. The base section 134 provides a convenient location for mounting printed circuit board 48 containing the control circuitry for the laser diode 34.

Figure 6:
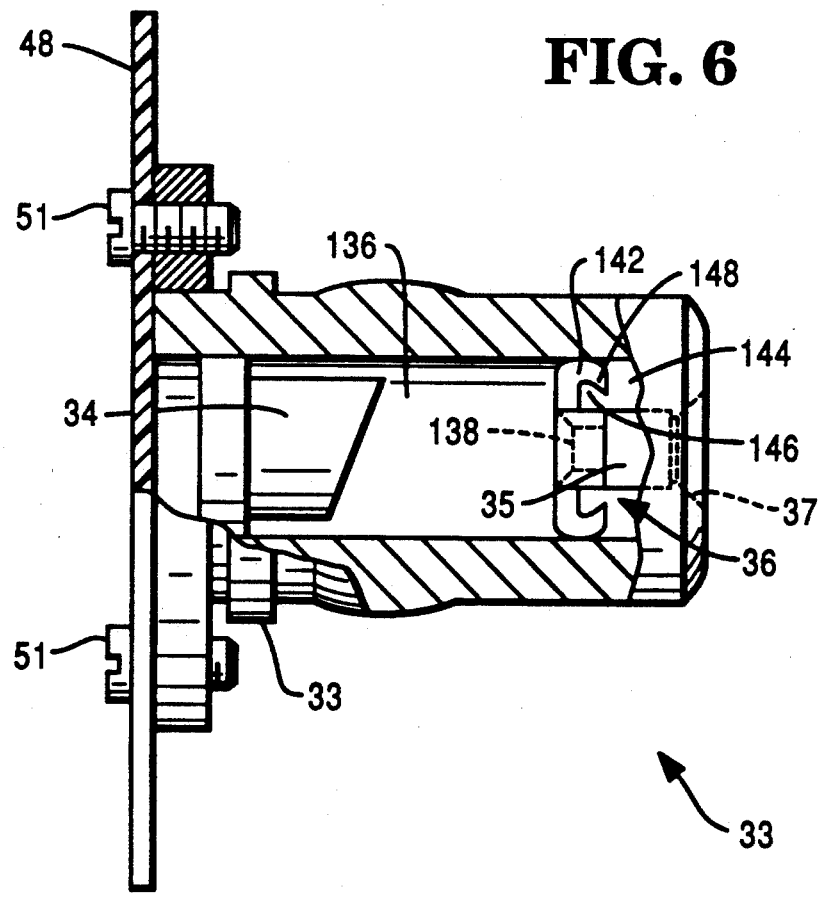
FIG. 6 is a sectional view of the plug member of the laser diode alignment apparatus of the present invention showing a first embodiment of the plug's internal components.

Referring now to FIG. 6, there is shown a profile of the plug member 33 containing a first group of internal components. Light from the laser diode 34 passes through lens lock 36 and focusing lens 35. Laser diode 34 is commercially available and is pressed into the back end of channel 136. Focusing lens 35 is a commercially available gradient index (grin) lens which is held in place in the front end of channel 136 by lens lock 36. Lens lock 36 includes a gasket portion 142 and a plug portion 144. Gasket portion 142 is made of plastic, vinyl, or rubber and has a latch 148. Gasket portion 142 also includes an aperture 138. Plug portion 144 contains aperture 37, is made of brass, and has a latch 146 which interlocks with the latch 148 of gasket portion 142.

Figure 7:
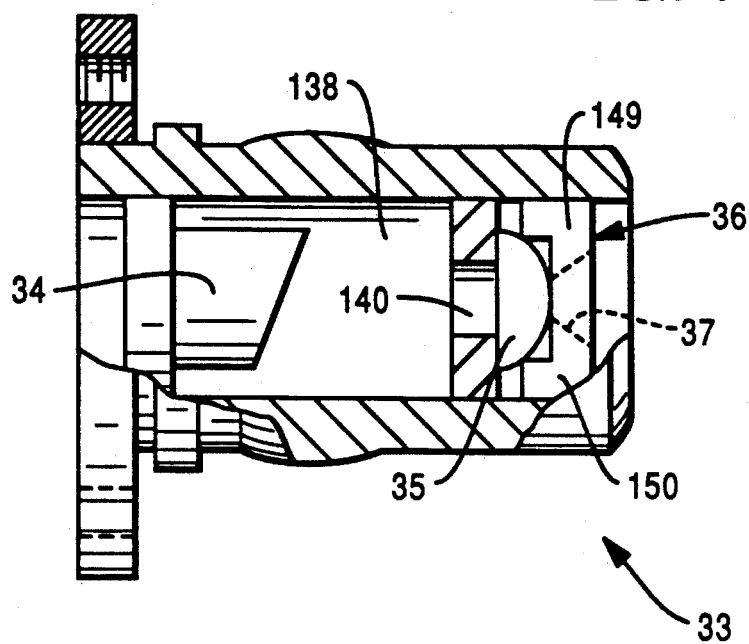
FIG. 7 is a sectional view of the plug member of the laser diode alignment apparatus of the present invention showing a second embodiment of the plug member's internal components.

Referring now to FIG. 7, there is shown a profile of the plug member 33 containing a second group of components. Light from the laser diode 34 passes through aperture 140, focusing lens 35, and lens lock 36. This embodiment also uses a commercially available laser diode which is pressed into channel 137. However, this embodiment employs a standard commercially available spherical focusing lens 35. The focusing lens 35 is held in place by lens lock 36, which includes an outer cylindrical portion 149 and an inner cylindrical portion 150. The aperture 37 is centrally located within the inner cylindrical portion 150 and widens as it extends frontwardly.

Figure 8:
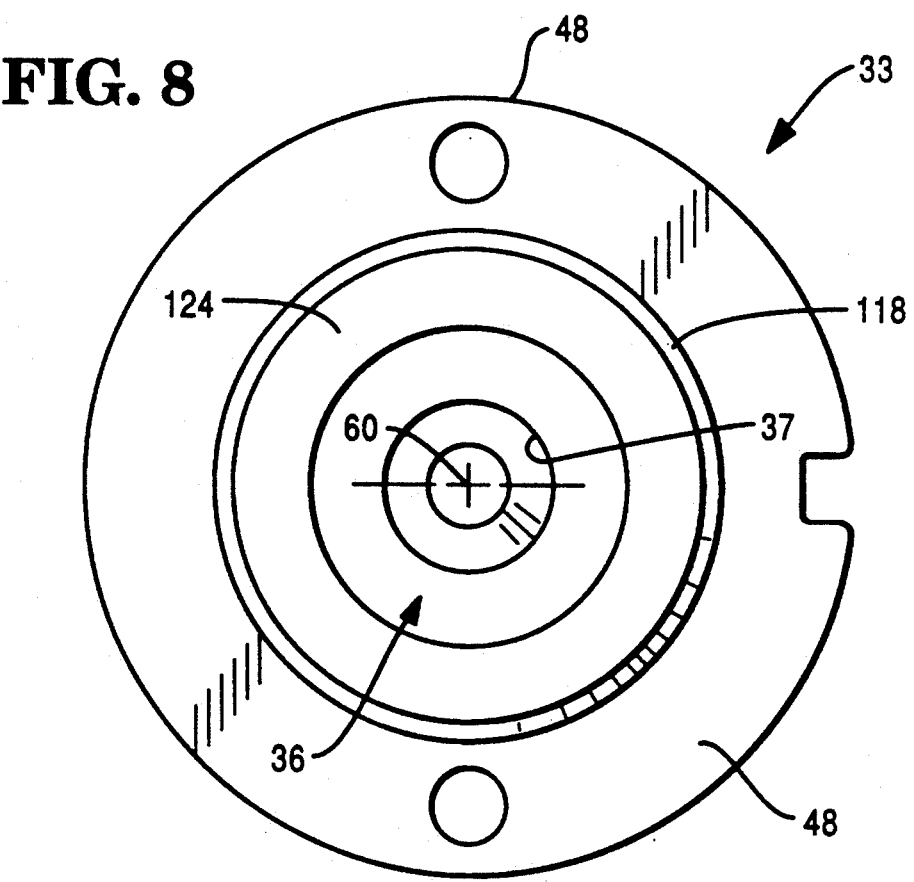
FIG. 8 is a front end view of the plug member of FIGS. 6 and 7.

Referring now to FIG. 8, there is shown a front view of the plug member 33 of FIGS. 6 and 7. The diameters of the circular apertures 37 of both embodiments are the same.

Figure 9:
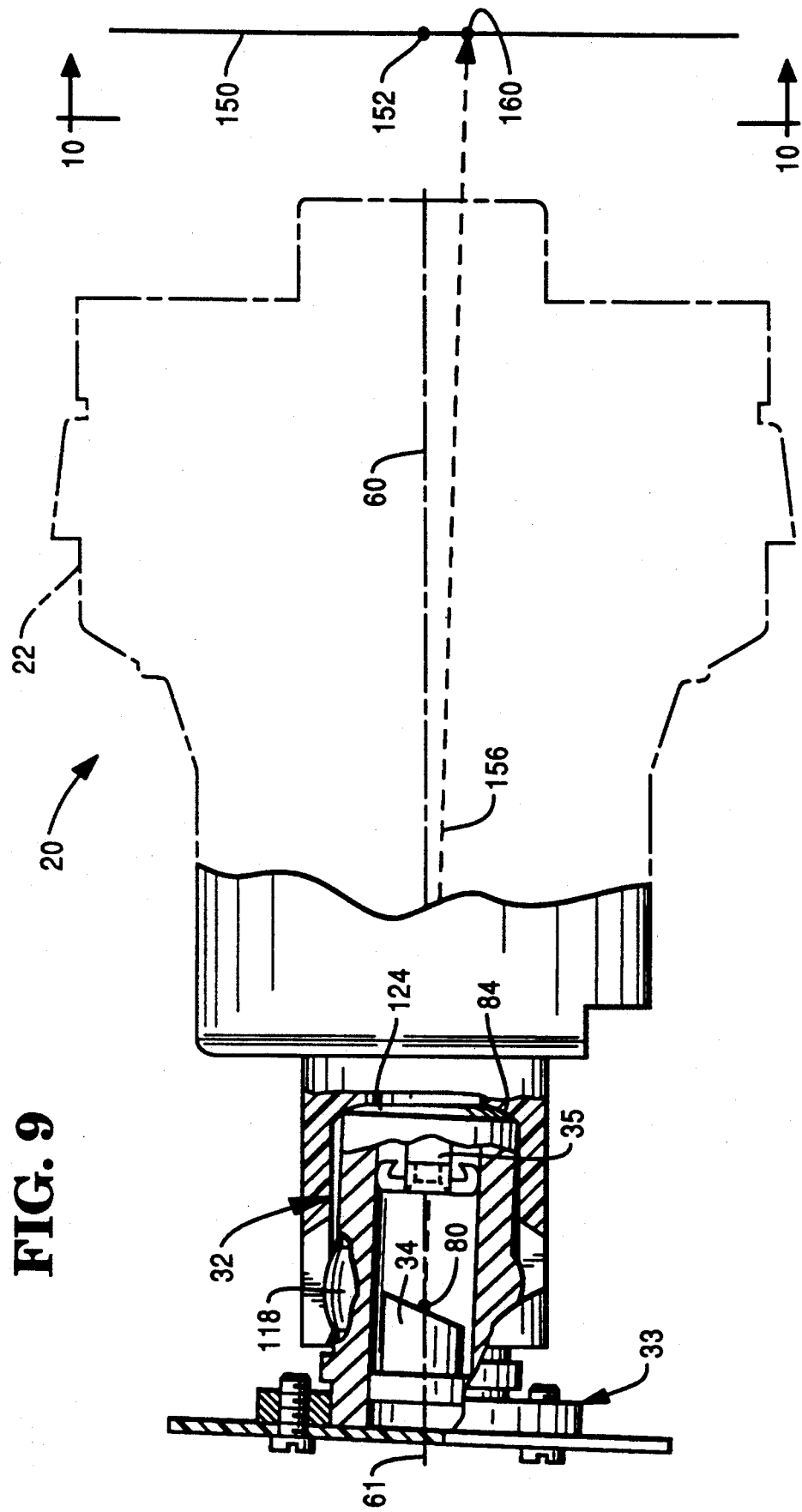
FIG. 9 is an elevation view, partially in section, of a scanner containing a laser diode, which is out of alignment, illuminating a target screen.
Figure 10:
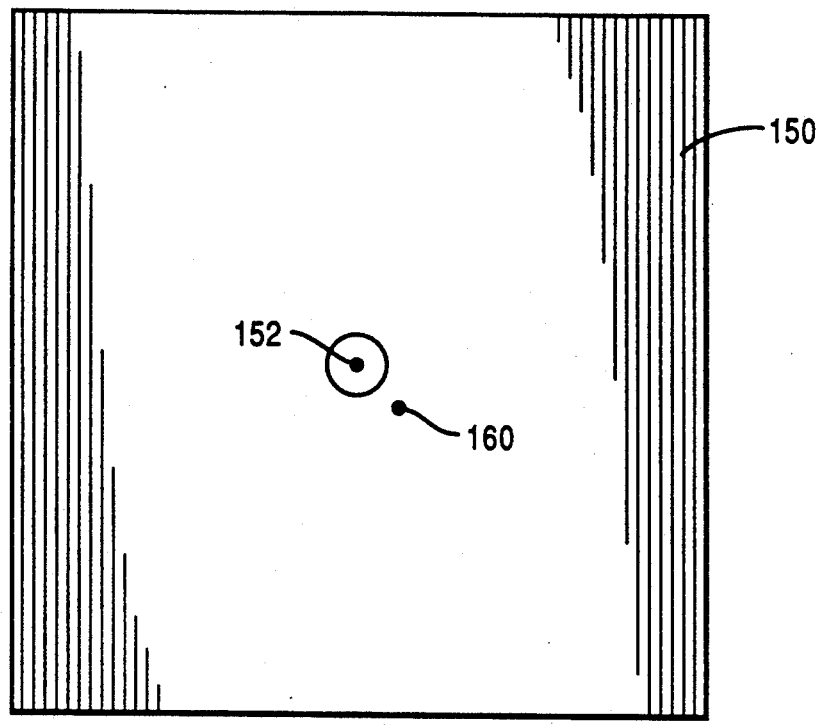
FIG. 10 is a view of the target screen of FIG. 9, taken along line 10—10 of FIG. 9.
Figure 11:
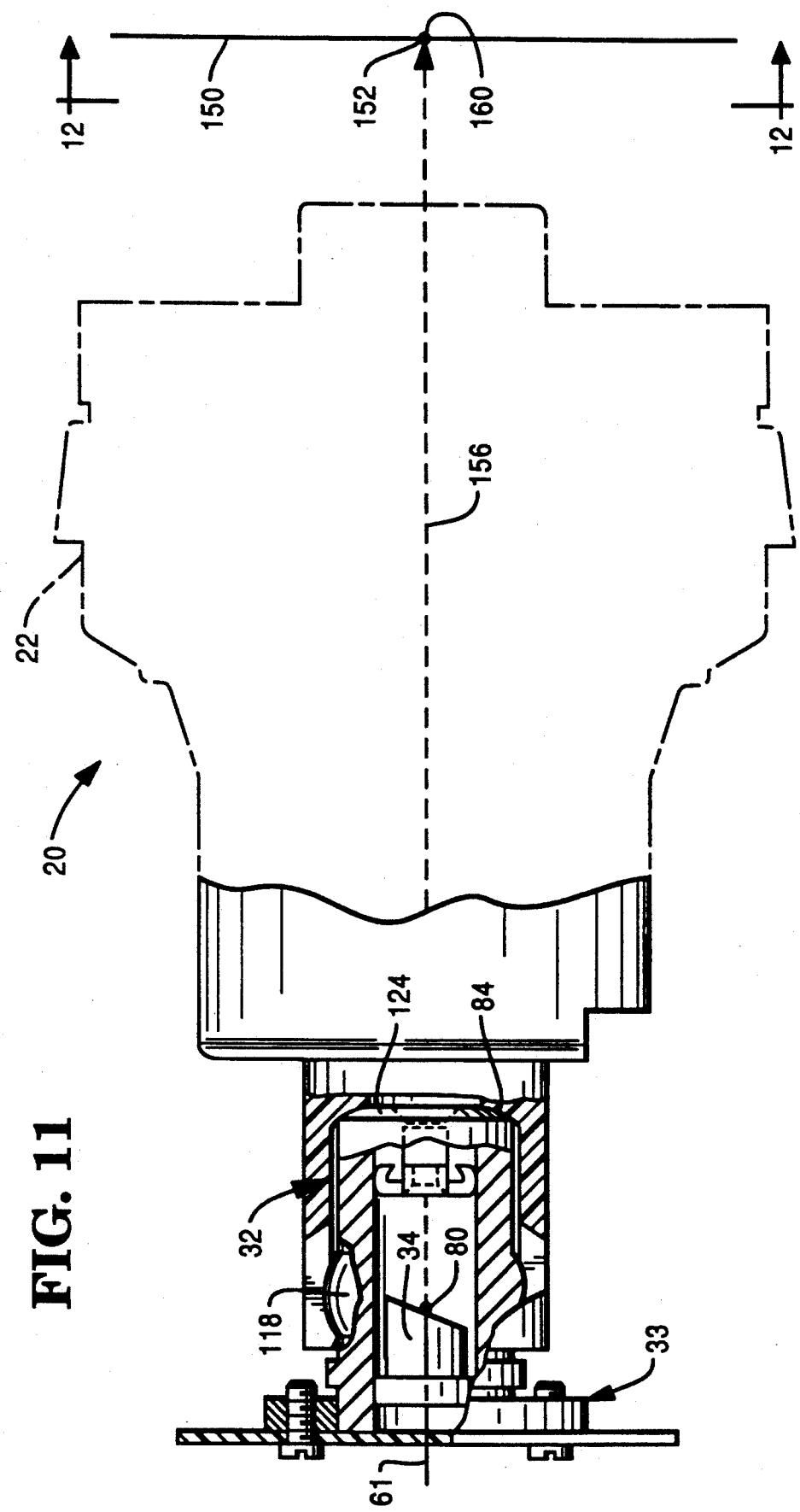
FIG. 11 is an elevation view, partially in section, of a scanner containing a laser diode, which is properly aligned, illuminating a target screen.

Referring now to FIGS. 9-11, the plug member 33 is inserted into the socket member 32 by grasping either the rear end portion or the printed circuit board until the spherical center portion 118 spreads the ridge 74 enough to pass through and into the socket member 32. When the plug member 33 is inserted, its front edge 124 contacts the inner surface 84 of the socket member's base portion 82. With the plug member 33 firmly in place, the beam origin point 80 is on the axis 60, thus eliminating centering error.

In order to eliminate pointing error, a screen 150 having a reference point 152 corresponding to the beam axis 60 is mounted in front of the scanner 20 at its focal point such that the reference point 152 is in line with the axis 60. The interior components of the scanner 20 are removed, leaving only the molded frame support member 22, the socket member 32, and the plug member 33. The laser diode 34 is energized and the plug member 33 is pivoted about the beam origin point 80 until the laser beam image 160 coincides with the reference point 152. The plug member 33 is then held in position by an adhesive administered through the expansion slots 112. Advantageously, both centering and pointing error are eliminated with only minimal adjustment.

FIGS. 9 and 10 illustrate the effects of pointing error. In FIG. 9, the laser beam 156 is not aligned with the scanner axis 60. Here, the angular deviation has been exaggerated for clarity. The off-axis laser beam 156 produces an image 160 which does not coincide with the reference point 152.

Figure 12:
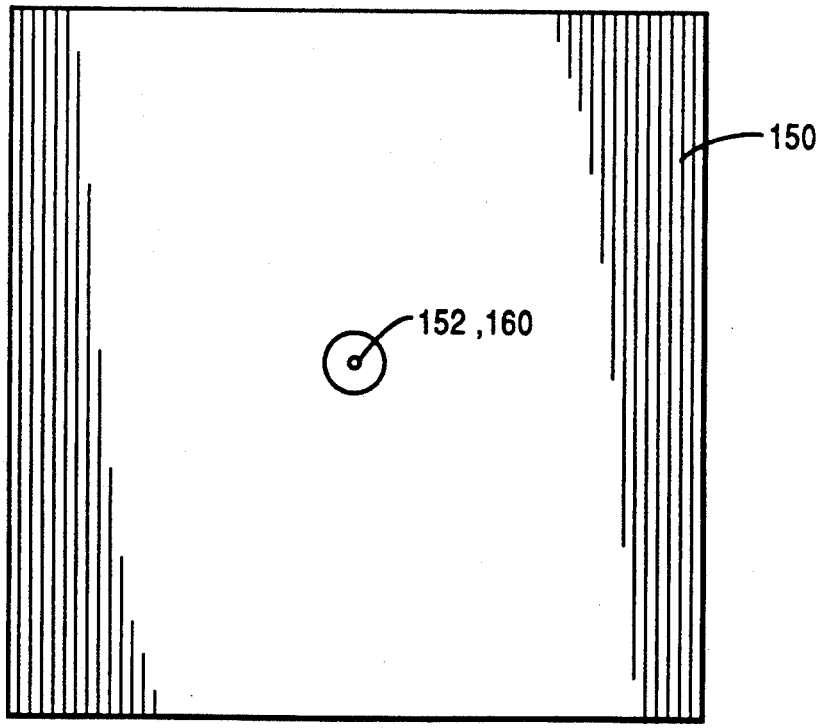
FIG. 12 is a view of the target screen of FIG. 11, taken along line 12—12 of FIG. 11.

In FIGS. 11 and 12, pointing error has been eliminated by properly aligning the laser beam 156 with the scanner axis 60 in accordance with the method of the present invention. Here, the plug axis 61 coincides with the scanner axis 60, although this may not always be the case. Once aligned, the plug member 33 is held in position by glue administered through the expansion slots 112. The on-axis laser beam 156 produces an image 160 which coincides with the reference point 152.

Although the invention has been described with particular reference to certain preferred embodiments thereof, variations and modifications of the present invention can be effected within the spirit and scope of the following claims.

What is claimed is:

1. In an optical scanner, an apparatus for aligning a laser beam produced by a laser diode comprising:
   a socket member, including a cylindrical wall portion around a central socket axis having a back end, an inner surface describing a cylindrical aperture, and a base portion coupled to the cylindrical wall portion having a circular aperture therethrough;
   a plug member having a central plug axis and having an aperture for containing the laser diode and including a cylindrical front end portion having a diameter smaller than the diameter of the cylindrical aperture; and means for pivotally and rotatably mounting the plug member within the socket member, the plug axis being alignable in a plurality of directions including a direction parallel to the socket axis and a direction across the socket axis in order to align the laser beam with the socket axis.

2. The apparatus as recited in claim 1, wherein the plug member has a combined center of rotation and pivot point on the plug axis.

3. The apparatus as recited in claim 1, wherein the mounting means comprises:
 a circular ridge around the inner surface having an inwardly facing spherical surface;
 a spherical center section, coupled to the cylindrical front end portion, having the same curvature as the inwardly facing spherical surface and having a diameter greater than the diameter of the ridge;
 a rearwardly facing spherical surface on the base portion; and
 a spherical front edge section on the cylindrical front end portion having the same curvature as the rearwardly facing spherical surface.

4. The apparatus as recited in claim 3, wherein the apparatus is operative to eliminate pointing error independently of centering error.

5. The apparatus as recited in claim 3, wherein the socket member further comprises:
 a neck portion, coupled to the base portion, including a cylindrical aperture therethrough; and
 a front end portion, coupled to the neck portion, having a cylindrical aperture therethrough.

6. The apparatus as recited in claim 3, wherein the wall portion further comprises a plurality of slots extending inwardly from the back end of the wall portion.

7. The apparatus as recited in claim 6, wherein the slots are operative to allow the wall portion to expand outwardly as the plug member is inserted into the socket member.

8. The apparatus as recited in claim 6, wherein the slots are operative to allow an adhesive to be poured into the socket member to retain the plug member.

9. The apparatus as recited in claim 3, wherein the ridge is operative to retain the plug member in the socket member after it has been inserted therein.

10. The apparatus as recited in claim 3, wherein the plug member further comprises a rear end portion, coupled to the center portion.

11. The apparatus as recited in claim 10, wherein the rear end portion comprises:
 a front cylindrical section having the same diameter as the front end portion;
 a middle cylindrical section having a diameter larger than the front end portion; and
 a cylindrical base section larger than the diameter of the middle section.

12. The apparatus as recited in claim 11, wherein the rear end portion is outside the socket member when the plug member is inserted therein.

13. The apparatus as recited in claim 12, wherein the front cylindrical section is long enough and thin enough to provide space for pivoting the plug member without impacting the cylindrical wall section.

14. The apparatus as recited in claim 11, wherein the rear end portion further comprises a printed circuit board, fastened to the base section, containing control circuitry for the laser diode.

15. The apparatus as recited in claim 11, wherein the plug member further comprises:
 a lens within the aperture; and
 a lens lock within the aperture adjacent the lens for retaining the lens in place.

16. The apparatus as recited in claim 15, wherein the lens comprises a spherical lens.

17. The apparatus as recited in claim 15, wherein the lens comprises a gradient index lens.

18. The apparatus as recited in claim 15, wherein the lens lock comprises:
 a cylindrical outer wall;
 a cylindrical inner wall centrally located within the outer wall and perpendicular thereto; and
 a central aperture in the inner wall 19. The apparatus as recited in claim 15, wherein the lens lock comprises:
 a circular gasket adjacent the lens; and
 a cylindrical wall interlockingly coupled to the circular gasket.

20. In an optical scanner, an apparatus for aligning a laser beam produced by a laser diode comprising:
 a socket member, including a cylindrical wall portion having a back end, an inner surface describing a cylindrical aperture, a circular ridge around the inner surface having an inwardly facing spherical surface, a plurality of expansion slots extending inwardly from the back end of the wall portion, and a base portion coupled to the cylindrical wall portion having a rearwardly facing spherical surface and a circular aperture therethrough; and
 a plug member having an aperture for containing the laser diode and including a cylindrical front end portion having a diameter smaller than the diameter of the cylindrical aperture and including a spherical front edge section having the same curvature as the rearwardly facing spherical surface, a spherical center portion coupled to the cylindrical front end portion having the same curvature as the inwardly facing spherical surface and having a diameter greater than diameter of the ridge, and a rear end portion coupled to the center portion, the plug member having a combined center of rotation and pivot point.

21. The laser diode alignment apparatus as recited in claim 20, wherein the plug member further comprises:
 a lens within the aperture; and
 a lens lock within the aperture adjacent the lens for retaining the lens in place.

22. In an optical scanner, an apparatus for aligning a laser beam produced by a laser diode comprising:
 a socket member, including a cylindrical wall portion having a back end, an inner surface describing a cylindrical aperture, and a base portion coupled to the cylindrical wall portion having a circular aperture therethrough;
 a plug member having an aperture for containing the laser diode and including a cylindrical front end portion having a diameter smaller than the diameter of the cylindrical aperture; and
 means for pivotally and rotatably mounting the plug member within the socket member including a circular ridge around the inner surface having an inwardly facing spherical surface; a spherical center section, coupled to the cylindrical front end portion, having the same curvature as the inwardly facing spherical surface and having a diameter greater than the diameter of the ridge; a rearwardly facing spherical surface on the base portion; and a spherical front edge section on the cylindrical front end portion having the same curvature as the rearwardly facing spherical surface.

23. The apparatus as recited in claim 22, wherein the apparatus is operative to eliminate pointing error independently of centering error.

24. The apparatus as recited in claim 22, wherein the socket member further comprises:
   a neck portion, coupled to the base portion, including a cylindrical aperture therethrough; and
   a front end portion, coupled to the neck portion, having a cylindrical aperture therethrough.

25. The apparatus as recited in claim 22, wherein the wall portion further comprises a plurality of slots extending inwardly from the back end of the wall portion.

26. The apparatus as recited in claim 25, wherein the slots are operative to allow the wall portion to expand outwardly as the plug member is inserted into the socket member.

27. The apparatus as recited in claim 25, wherein the slots are operative to allow an adhesive to be poured into the socket member to retain the plug member.

28. The apparatus as recited in claim 25, wherein the ridge is operative to retain the plug member in the socket member after it has been inserted therein.

29. The apparatus as recited in claim 25, wherein the plug member further comprises a rear end portion, coupled to the center portion.

30. The apparatus as recited in claim 29, wherein the rear end portion comprises:
   a front cylindrical section having the same diameter as the front end portion;
   a middle cylindrical section having a diameter larger than the front end portion; and
   a cylindrical base section larger than the diameter of the middle section.

31. The apparatus as recited in claim 30, wherein the rear end portion is outside the socket member when the plug member is inserted therein.

32. The apparatus as recited in claim 31, wherein the front cylindrical section is long enough and thin enough to provide space for pivoting the plug member without impacting the cylindrical wall section.

33. The apparatus as recited in claim 30, wherein the rear end portion further comprises a printed circuit board, fastened to the base section, containing control circuitry for the laser diode.

34. The apparatus as recited in claim 30, wherein the plug member further comprises:
   a lens within the aperture; and
   a lens lock within the aperture adjacent the lens for retaining the lens in place.

35. The apparatus as recited in claim 34, wherein the lens comprises a spherical lens.

36. The apparatus as recited in claim 34, wherein the lens comprises a gradient index lens.

37. The apparatus as recited in claim 34, wherein the lens lock comprises:
   a cylindrical outer wall;
   a cylindrical inner wall centrally located within the outer wall and perpendicular thereto; and
   a central aperture in the inner wall.

38. The apparatus as recited in claim 34, wherein the lens lock comprises:
   a circular gasket adjacent the lens; and
   a cylindrical wall interlockingly coupled to the circular gasket.

* * * * *